Figure 1:
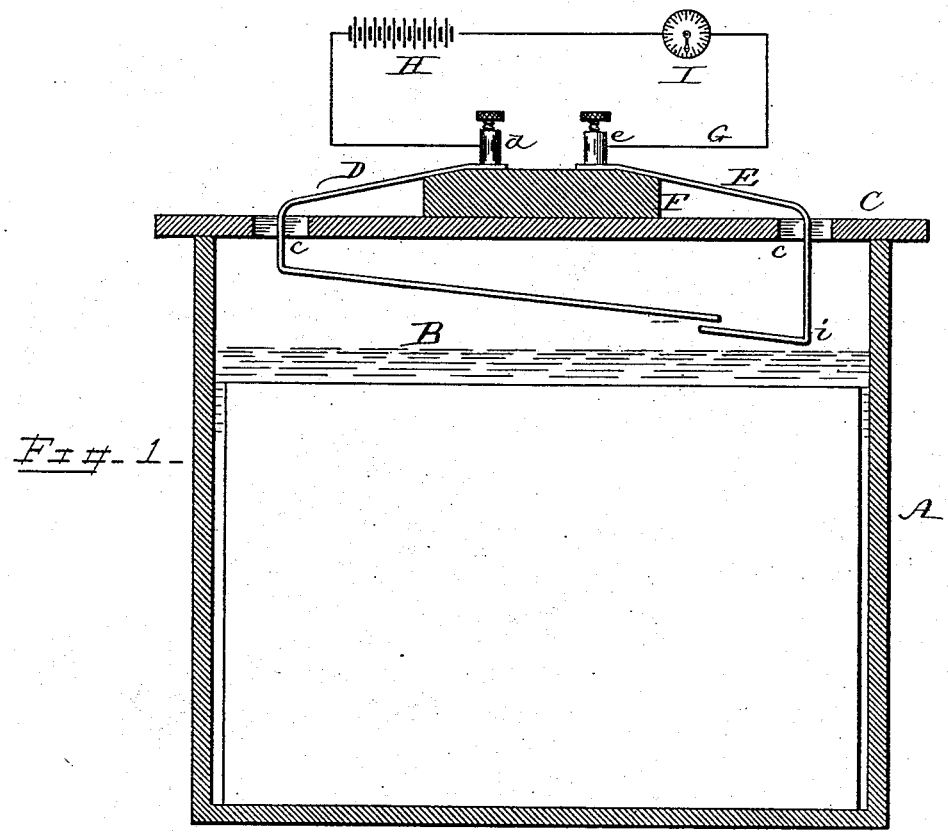

(No Model.) 2 Sheets—Sheet 1.

S. C. C. CURRIE.
INDICATOR FOR SECONDARY BATTERIES.

No. 394,100. Patented Dec. 4, 1888.

WITNESSES
Albert B. Blackwood.
Oscar W. Humphrey

INVENTOR
S. C. C. Currie.
by Connolly Bros.
Attys (No Model.) 2 Sheets—Sheet 2.
S. C. C. CURRIE.
INDICATOR FOR SECONDARY BATTERIES.
No. 394,100. Patented Dec. 4, 1888.
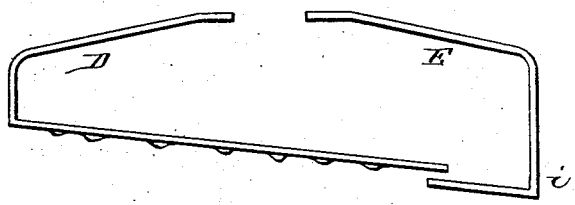
Fig-3-
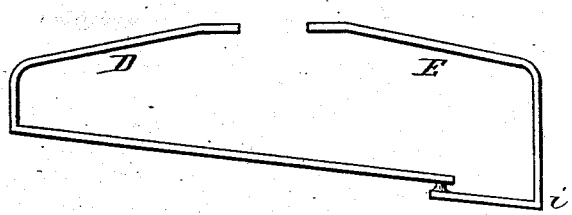
Fig-4-
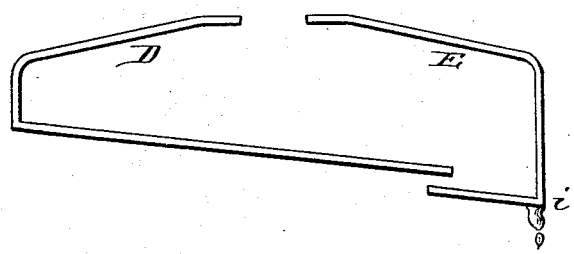
Fig-5- bEST AVAILABLE COP'

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER, NEW JERSEY.

INDICATOR FOR SECONDARY BATTERIES.

SPECIFICATION forming part of Letters Patent No. 394,100, dated December 4, 1888.

Application filed May 24, 1888. Serial No. 274,951. (No model.)

*To all whom it may concern:*

Be it known that I, STANLEY C. C. CURRIE, a subject of the Queen of Great Britain, residing at Philadelphia, in the county of Philadelphia and State of Pennsylvania, have invented certain new and useful Improvements in Indicators for Secondary Batteries; and I do hereby declare the following to be a full, clear, and exact description of the invention, reference being had to the accompanying drawings, which form part of this specification.

In an application for Letters Patent of the United States filed by me January 22, 1888, Serial No. 261,888, I have described an apparatus for indicating by an electrically-operated visual or audible signal the point at which a secondary battery or accumulator, or nest or set of the same, has become fully charged; and my present invention has relation to indicators for secondary batteries of the same class as that described in my above-named application.

When a secondary battery or accumulator becomes fully charged, an ebullition takes place, due to the escape of gas from the fluid contents of the battery, creating a spray that rises a short distance above the surface of the fluid, and in the apparatus described in my before-mentioned application for Letters Patent the spray so created is utilized to establish electrical connection between terminal points of an electric circuit, including an indicating device, which was thereupon automatically operated, indicating the fact that the battery was fully charged. In the above-mentioned indicating apparatus the terminal points of the indicator-circuit are connected by a section of material of high resistance, or a section of material which is when dry a non-conductor, and the deposit of moisture upon the same from the spray electrically connects the terminals; or they consist of two battery elements arranged in such proximity to one another and to the surface of the fluid in the battery that the deposit of moisture from the spray will generate an electric current and thereby operate the indicating device.

In practice I have found that where the non-conducting or resistance strip or section is used there is considerable difficulty in drying the same after it has been in use, so as to render it fit for use a second time, as the acidulated water deposited by the spray does not readily evaporate, and where the battery elements are employed they speedily corrode and have to be replaced.

My present invention has for its object the provision of novel means for establishing electrical connection between the terminal points of the indicator-circuit which shall be free from the objections above noted; and my invention consists in attaching to the terminals of the indicator-circuit sections of a material practically non-corrosive—as lead or the like—arranged in juxtaposition above the surface of the fluid in a battery, and so that the moisture deposited by the spray will arrange itself in a drop or drops of water which will bridge the space between the sections of material, and thus establish electrical connection between the terminals of the indicator-circuit.

My invention further consists in the novel construction, combinations, and arrangements of parts hereinafter described and specifically claimed.

Figure 2:
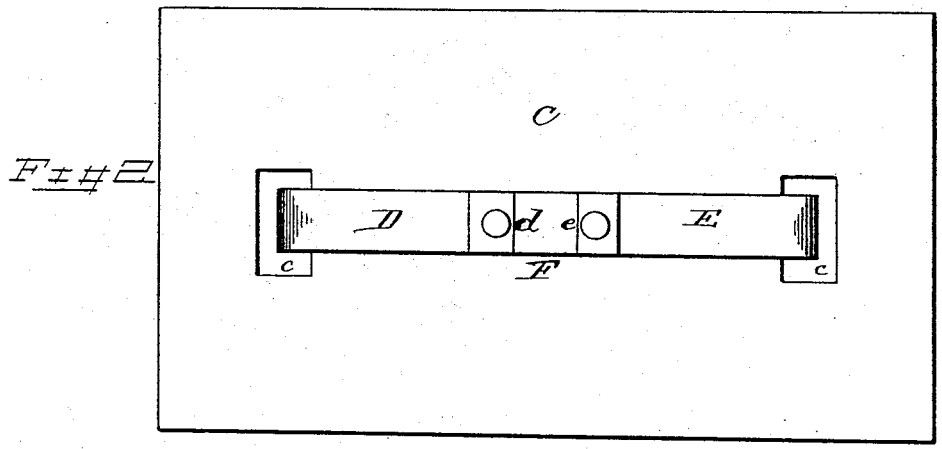

Referring to the accompanying drawings, Figure 1 is a vertical sectional view of an accumulator or secondary battery having my improved indicator applied thereto. Fig. 2 is a top view of the same; and Figs. 3, 4, 5, diagrams illustrating the action of the liquid deposited on the sections connected with the terminals of the indicator-circuit.

A designates an accumulator, and B the liquid contained therein.

C designates a piece of non-conducting material—as glass, ebonite, or the like—which rests upon the top of the battery A and is formed with two openings, *c c*, through which pass strips of lead, D E, that are bent around on top of and fastened to a block of non-conducting material, F, that rests upon the piece C. Screw-cups *d e* upon the ends of sections D E serve to receive the terminals of an electric conductor, G, forming a circuit containing a battery, H, and an indicator, I, which may be a visual or audible signal of any known or desired construction operable by means of an electric current. Beneath the strip C the sections D E are bent toward each other, and are brought close together at their ends, but without touching, and the end of section D, which serves to collect the moisture, is made considerably longer than that of section E. The ends of both are slanted, so that as the fluid deposited by the spray accumulates it will run down the end of section D, and after bridging the space between the sections for a brief interval will run down the end of section E to a point, $i$, thereon, and will then drop off into the battery.

The different positions of the drop or globule are illustrated in Figs. 3, 4, and 5. In Fig. 3 the moisture is shown collecting in small globules along the slanting portion of section D. In Fig. 4 the small globules have accumulated and formed a drop of sufficient size to bridge or span the space between the sections D and E, and in this condition the electric circuit is completed through the drop, and the indicator thereupon thrown into action for as long a period as the drop spans or bridges the space, which period may be nicely determined and regulated by increasing or diminishing the distance between or the area of the sections D E. After the indicator has been brought into action, as above described, the drop of fluid descends to the end $i$ of section E, as shown in Fig. 5, and eventually falls into the battery. This action is repeated from time to time as the drops accumulate until the operator removes the indicator appliances from the battery.

The principle advantages of the invention above described are that the apparatus may be removed from a battery or accumulator after having been in use and immediately applied to another without the necessity of waiting for the sections to dry, and, being practically non-corrosive, the sections will last for an indefinite period. The terminals of the circuit, being upon the upper side of the non-conducting strip, are out of reach of the spray and fluid from the battery, and hence there is no danger of an accidental completion of the indicator-circuit.

Having fully described my invention, I claim—

1. In an indicator for accumulators or secondary batteries, the combination, with a normally incomplete electric circuit containing an indicator, of two sections of material connected one to each terminal of said circuit, arranged with their ends in juxtaposition and at an angle to a horizontal position, so that moisture accumulating on the surface of one of the sections will assemble in drops and bridge the space between the sections, substantially as described.

2. In an indicator for accumulators or secondary batteries, the combination, with the strip C, having holes $c\ c$, of the conducting-sections D E, having each one end secured upon top of said strip and their other ends passed through said holes and brought into juxtaposition beneath said strip, substantially as described.

3. In an indicator for accumulators or secondary batteries, the combination of a non-conducting strip adapted to be placed on top of the battery-casing with two sections of practically non-corrosive material, having each one end secured to said strip and their other ends in proximity, and an electric circuit of which said sections form the terminals, substantially as described.

In testimony that I claim the foregoing I have hereunto set my hand this 18th day of May, 1888.

STANLEY C. C. CURRIE.

Witnesses:
JOHN W. LEWIS,
WILLIAM J. WALL.